Jan. 14, 1958   C. E. BORGSTROM ET AL   2,819,612
AIRCRAFT SCALE INSTALLATION HAVING
ADJUSTABLE PLATFORM SEGMENTS

Filed Sept. 16, 1955   3 Sheets-Sheet 2

INVENTORS
Charles E. Borgstrom
William Van Triest

BY W. R. Robertson

AGENT

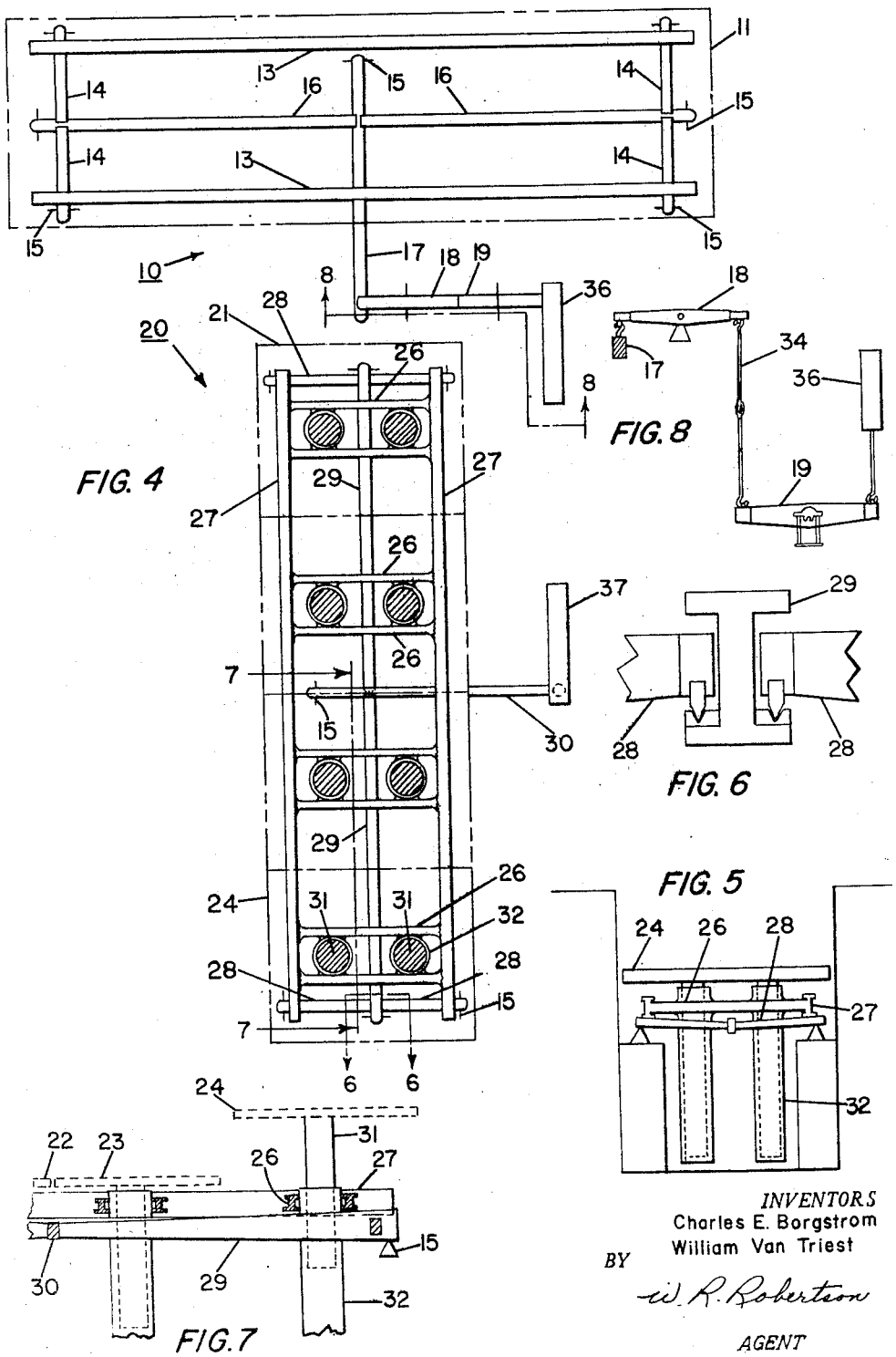

United States Patent Office 2,819,612
Patented Jan. 14, 1958

2,819,612

AIRCRAFT SCALE INSTALLATION HAVING ADJUSTABLE PLATFORM SEGMENTS

Charles E. Borgstrom, Dallas, Tex., and William Van Triest, Cincinnati, Ohio, assignors to Chance Vought Aircraft, Incorporated, Dallas, Tex., a corporation of Delaware Application September 16, 1955, Serial No. 534,645

7 Claims. (Cl. 73—65)

The disclosed invention relates to vehicle scales, and more specifically, to an improved scale installation for weighing an airplane and for determining the shift in its center of gravity as the airplane assumes various positions or attitudes.

Aircraft builders long have needed to know whether the aircraft they finally produced met specifications for weight. Because of the heavier wing loading of today's aircraft, weight has become an increasing critical factor. Finding the aircraft weight now involves many problems due to the aircraft size, tremendous weight, multipoint suspension, and care in ground handling.

Disadvantages alleviated by the new scales comprise the maintenance of scale installations large enough to accommodate larger size wheel bases of existing and future aircraft and yet not be so large, heavy, bulky, and cumbersome as to require the raising and lowering of a large massive platform and its associated elevator mechanism in addition to the larger aircraft thereon; and the storage problem wherein all portable scales, for example, for weighing aircraft have to be rolled out of the way on the hangar floor when not in use. Any movement of scales on a concrete floor produces wear and tear, if not detrimental results to the scales' knife edges, and, if overhead scales are utilized, overhead hoists, block and tackle, etc., and at least one hoisting point on the aircraft to be weighed are required. Our new scale installation is used as part of the hangar floor when not in use.

Additional disadvantages eliminated are the requirements of leveling each scale at four points before a reading can be recorded. This necessary and time consuming leveling process can be done only after the airplane is positioned on the scales or on jacks, which is turn are balanced on the scales for maintaining the aircraft in the desired attitude. Further, rolling the aircraft up a ramp and onto the scales is quite a task when considering the weight involved and the delicate handling of such an expensive, frangible, and awkward vehicle on the ground, much less getting the aircraft up onto jacks and/or blocks, all of which must be setting on the scales. It is to be noted that for obtaining the official weight of any aircraft, it must be weighed in the level or flying attitude, i. e., with the tail jacked up while on the scales. With the aircraft positioned on the blocks or jacks and with the blocks or jacks balanced on the scales, a top heavy and unstable situation exists, particularly since each of the scales then has to be leveled before readings can be recorded. While this instability may be avoided in part at least by the installation of fixed scales in the floor, the wheel base is then limited and permits the weighing of only those aircraft having that particular wheel base. All of the above weighing methods are time consuming. In addition, each of these disadvantages is alleviated by our aircraft scales disclosed in detail hereinafter.

Since the average jet fighter's weight is one-fourth to one-third gasoline, the shift of the center of gravity as this fuel is burned up becomes vitally important to the design engineers. The nose wheel when weighing the tricycle type of aircraft, or the tail wheel when weighing the conventional tail wheel type of aircraft is positioned on an adjustable section of the novel scales and this section is varied in any number of positions in raising or lowering the airplane's nose or tail to simulate various attitudes as climbing or diving at different angles and high or low speed cruising attitudes in maintaining level flight.

The center of gravity must be rigidly controlled between certain limits as the airplane maneuvers and its fuel load varies. By use of the new aircraft scales, the travel or shift of the center of gravity can be determined as the airplane rests on the scale installation.

Further, by the use of the new installation, the flight center of gravity characteristics of an experimental airplane or missile at various attitudes and fuel loading can be quickly, accurately, and efficiently determined. This data is obtained while the new or experimental aircraft is still on the ground and will not have to be estimated on paper or found out after it has made its first flights.

One of the principal advantages of this unique scale installation is that while herebefore it has taken an hour to finish a weighing job, with our new scales installation it can be done in 15 minutes.

A principal object of the disclosed invention that we have achieved is to provide a scale installation that is very versatile in the weighing of aircraft, and which has a high degree of accuracy and speed.

Another principal object of the disclosed invention is to provide a scale installation that requires the raising and/or lowering of merely one segment of an adjustable scale and the supported auxiliary landing gear of an aircraft to be weighed while, with its main landing gear maintained safe and stable at ground level, the aircraft is rotated to various attitudes for weighing and determining the shift in center of gravity.

Another object of our invention is to provide in combination with the aircraft scales a scale installation from which can be plotted the shifts in an aircraft's center of gravity due to fuel consumption and due to different attitudes assumed by the aircraft.

Other objects and advantages of the invention will be apparent from the following detailed description, together with the accompanying drawings, submitted for purposes of illustration only and not intended to define the scope of the invention, reference being had for that purpose to the subjoined claims.

In the drawing:

Fig. 4 is a schematic plan view of the scale installation comprising both the adjustable section and the fixed section with the platform segments shown in phantom;

Fig. 5 is an end view of the adjustable scales of Fig. 4 as it would appear with one section lowered below ground level;

Fig. 6 is an enlarged detailed section of the end main levers taken at 6—6 on Fig. 4;

Fig. 7 is a detailed section taken at 7—7 on Fig. 4 showing a transverse lever particularly; and Fig. 8 is a view taken at 8—8 on Fig. 4 illustrating schematically the wobble arm linkage of the fixed scale.

Figure 1:
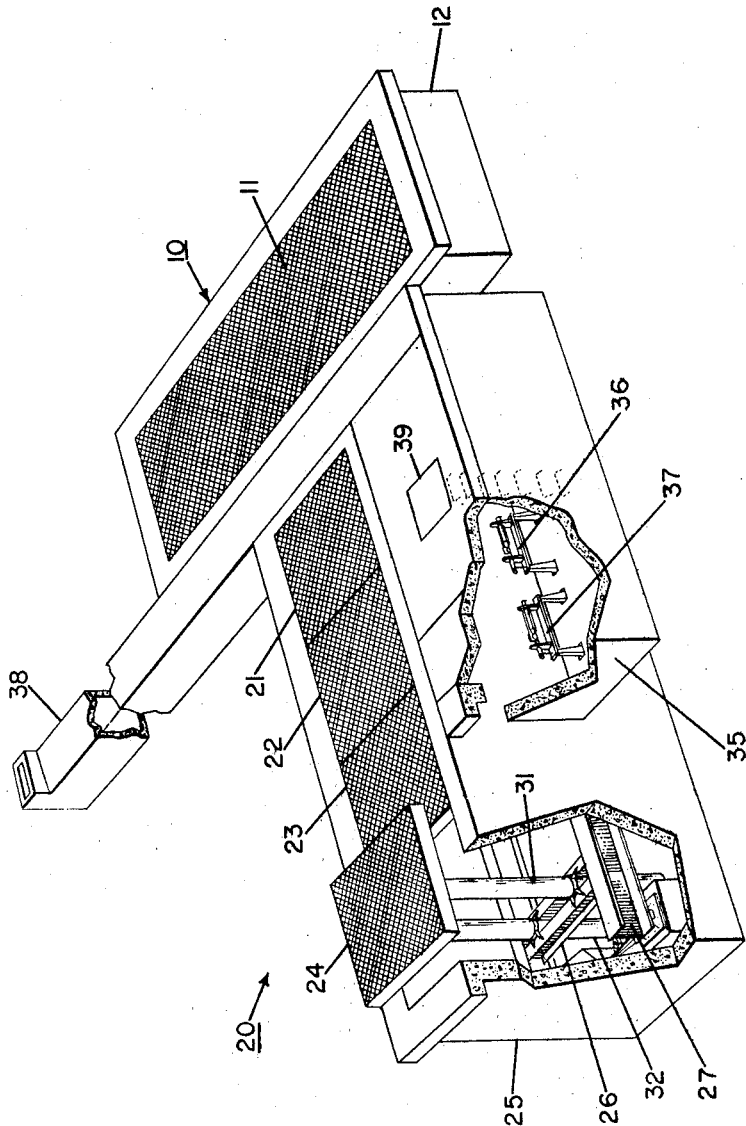
Fig. 1 illustrates a perspective view of the scale installation sunk in the ground and cut away in parts for clarity of disclosure.

A double purpose scale for installation in the floor of a hangar, ground, or taxi area convenient for the rolling of aircraft thereon is illustrated in Fig. 1. This scale installation is particularly designed for the weighing of heavy aircraft, and is also for the plotting of shifts in the airplane's center of gravity due to fuel consumption, for example.

Our scale installation consists of two sections positioned in the shape of a T, Fig. 1, with the fixed section or scale 10 forming the top or crossbar of the T and the adjustable section or scale 20 forming the vertical part of the T.

The fixed section 10 illustrated in Fig. 1, of the disclosed scale installation comprises any commercial type straight lever ball-bearing scale, such as, but not limited to a Howe 30 ton straight lever ball-bearing motor truck scale #5994 shown in the Howe Scales Company of Rutland, Vermont catalogue number fifty-one page RJ1-1 and 2. This scale is shown, Fig. 1, comprising a floating platform 11, which in our installation, consists of a concrete slab ten feet wide and thirty-four feet long. Below the platform is a five foot pit 12 for housing the weighing mechanism described hereinafter in regard to the detailed illustration in Fig. 2. If the tare weight amounted to 30,000 pounds and only two 30 ton scales were utilized in the scale installation, i. e., scales will support 120,000 pounds, an aircraft up to (120,000— 30,000) or 90,000 pounds may be weighed. Fig. 1 also illustrates the adjustable section 20 of the scale installation consisting of four platform segments 21, 22, 23, and 24, all of which are supported on a second 30 ton motor truck scale and each platform segment of which is adjustable in height and can be raised or lowered, as in our installation five feet above or below the ground level, independently of the supporting scale so that the airplane's position may be changed to simulate practically any flight attitude. The scale mechanism for this adjustable section is housed in a pit 25 preferably twenty feet deep, thirty-four feet long, and ten feet wide. While all the foregoing dimensions are for our specific installation, obviously they may be varied as desired and still remain within the scope of the invention.

Beside this latter pit 25, is another and smaller operating pit 35 shown in Fig. 1 which houses the personnel for operating the measuring instruments which include two scale reading beams 36 and 37 for indicating the weights placed on each of the two scale sections. Our operating pit 35 measures eight feet by seven feet, and twenty-five feet long. The operating pit 35 is equipped with lights, water, pressure ventilation, and a fire warning and extinguishing system, the utility lines as water, electric, and air being fed in through utility trench 38. Entry to the operating pit 35 is made through heavy steel door 39 in the floor and operated by a pneumatic motor, not shown. Controls (not shown) for the hydraulic lifts are preferably located outside the pit on the ground level for best visibility during aircraft attitude changing operations.

Figure 2:
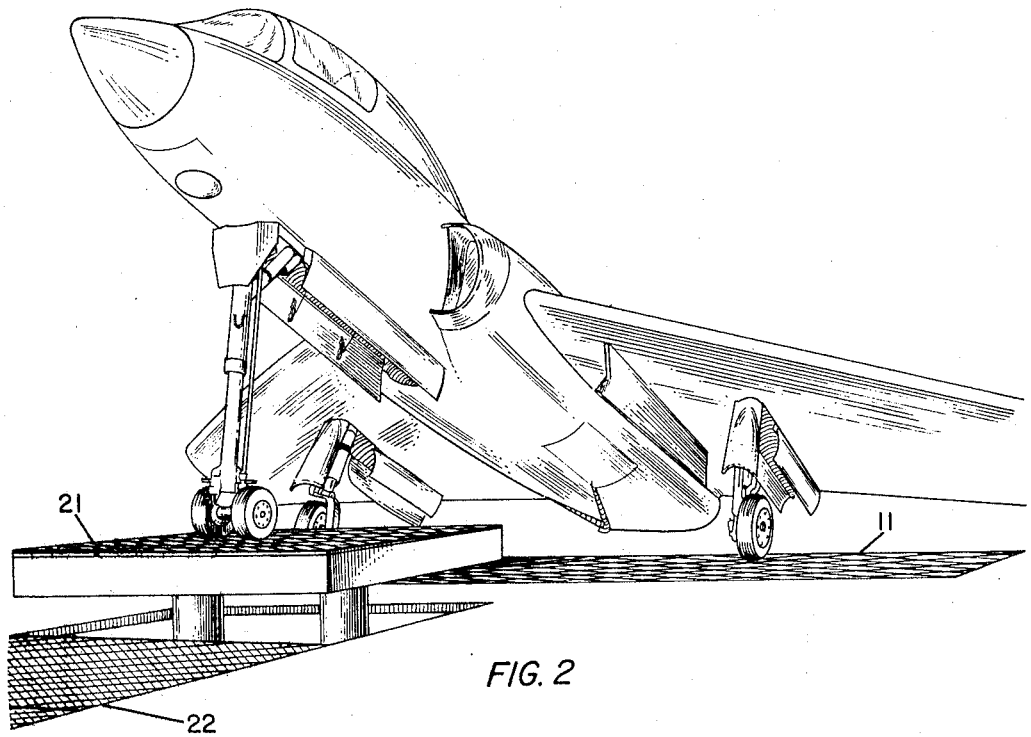
Fig. 2 is a perspective view of an aircraft on the scale installation with a platform segment of the adjustable scale section raised.
Figure 3:
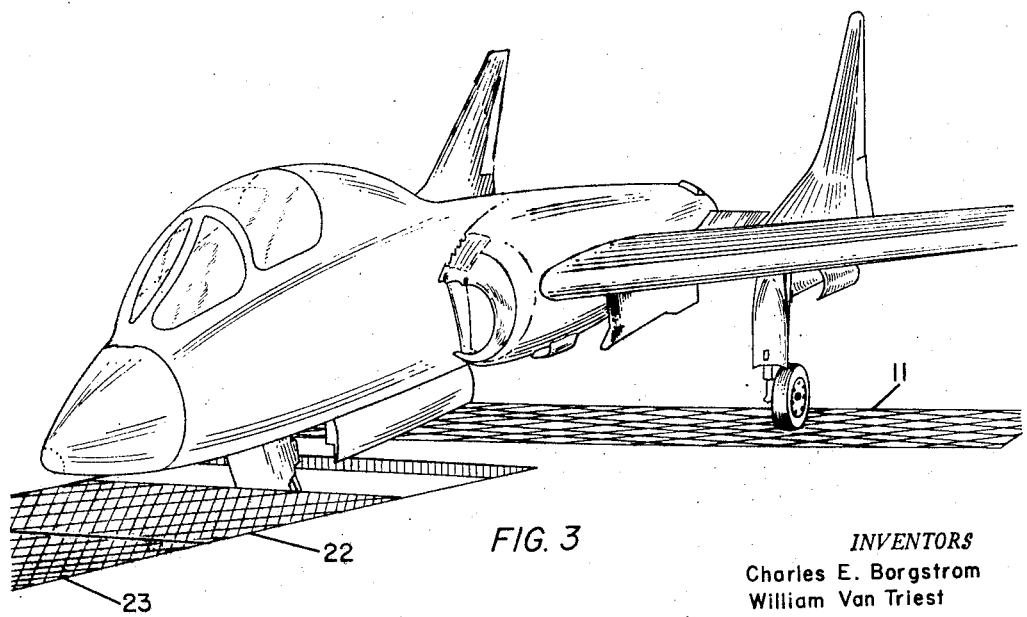
Fig. 3 is a view similar to Fig. 2, but with the platform segment in a lowered position.

Fig. 2 illustrates a typical weighing of a tricycle landing gear type of aircraft at a particular angle of climb with its main wheels positioned on the fixed section platform 11 and its nose wheel in raised position on adjustable platform segment 21 of the adjustable section of the scale installation. Fig. 3 likewise illustrates a typical weighing of an aircraft after being placed in the desired angle of glide, letdown, or dive, by actuation of the adjustable platform segment 21 below the ground level.

Fig. 4 illustrates schematically the scale installation with the platforms shown in phantom illustrating the weighing mechanism of the fixed section at the top forming the crossbar of the T and that of the adjustable section below forming the vertical part of the T. The weighing mechanism or scale linkage of the fixed section of the scale installation comprises a pair of longitudinal platform supporting I-beams 13 supported at their outer ends on two pairs of main levers 14. As disclosed in the aforementioned motor truck scales, ball bearings are preferably provided between the longitudinal I-beams 13 and the main levers 14. While the outer end of each of the main levers 14 is supported on a knife edge 15, the other or inner end rests on an end extension 16. With the outer end of each of the two end extensions 16 illustrated also supported on a knife edge 15, the other or inner ends rests on transverse lever 17, one end of which being supported on a knife edge 15 and the other end being connected to a wobble arm linkage. This wobble arm linkage, comprising pivotally connected links 18 and 19, through tie rod 34, Figs. 4 and 8, actuates scale reading beam 36.

The weighing mechanism or scale linkage of the adjustable section of the scale installation comprises a number of lift installations, as four in our scale section for example, all supported on crossties 26 fixedly connected between two longitudinal I-beams 27, Figs. 1 and 4. The scale linkage supporting these two longitudinal beams 27 is similar to the 30 ton scale described above in scale section 10 and is described hereinafter. Longitudinal beams 27 are supported at their outer ends on two pairs of main levers 28. The outer end of each main lever 28 is supported on a knife edge 15 and the other or inner end rests on one of the two end extensions 29. The outer ends of each end extension 29 is supported on a knife edge while the other or inner end rests on transverse lever 30, the latter lever being supported on a knife edge 15 at one end and connected to the second scale reading beam 37 along side scale reading beam 36. While the two sections of the scale installation are not interconnected, the scale reading beams 36, 37, for both are positioned side by side as illustrated in the small operating pit 35 for the scale operating personnel. A typical lift installation supported by a pair of crossties 26 welded at their ends between longitudinal I-beams 27 comprises hydraulic lifts having piston and cylinders 31 and 32, respectively, and including hydraulic pumps, oil, and connections therefor (not shown). The entire lift installation is suspended from the two longitudinal I-beams which results in no change in tare reaction when the lift position or adjustable platform segment, as 24 for example, is varied to an upper or lower position, noting Figs. 2 and 3.

In operation, the aircraft is rolled upon the scale installation with the main gear of the aircraft undercarriage resting on the crossbar of the T or fixed section platform 11 and with the auxiliary gear of the aircraft undercarriage as the nose or tail wheel, depending on the type of aircraft being weighed, resting on one of the four adjustable platform segments 21—24, as determined by the length of the aircraft. Aircraft having skids, skis, or pontoons may be placed on rollers or dollies and easily rolled in place upon the scale installation. The aircraft is then positioned in the desired attitude, noting Figs. 2 and 3, by operation of the hydraulic lift installation for the particular platform segment being used through the range of operation of the lift. With the aircraft so positioned, besides merely determining the aircraft weight, scale readings are taken and the center of gravity plotted for all the positions or attitudes of the aircraft desired.

Accordingly a scale installation is provided that is simple, economical to construct, and provides a high degree of speed and accuracy when determining the weight and center of gravity of aircraft, or other large vehicles.

It will be obvious to those skilled in the art that various changes may be made in the invention without departing from the spirit and scope thereof and therefore the invention is not limited by that which is shown in the drawings and described in the specification, but only as indicated in the appended claims.

We claim:

1. A scale installation comprising, a first scale for weighing the main gear of an aircraft undercarriage, and a segmented second scale having a plurality of segments for weighing the auxiliary gear of the aircraft undercarriage, each of said segments having a lift means on said second scale, at least one of said lift means comprising means for actuating its respective segment between a position substantially below said first scale and a position substantially above said first scale for varying the attitude of the aircraft during weighing operations for determination of the shift of the aircraft center of gravity.

2. A scale installation comprising a first scale for supporting the main gear of an aircraft undercarriage and a segmented second scale having a plurality of independently adjustable platform segments for supporting the auxiliary gear of the aircraft undercarriage, a lift means supporting one of said platform segments on said second scale, said lift means being operable for moving said one segment in a range between a position substantially below said first scale and a position substantially above said first scale for varying the attitude of the aircraft during weighing operations, for determination of the shift of the aircraft center of gravity.

3. A scale installation for weighing and determining the shift in the center of gravity of an aircraft comprising, a fixed scale having a platform for positioning the main gear of the aircraft undercarriage thereon, and an adjustable scale having supporting means, individually controllable motors supported by said means, an adjustable scale platform for positioning thereon the auxiliary scale gear of the aircraft undercarriage, said adjustable scale platform having a plurality of segments mounted on said motors, each of said motors being operable to move its respective platform segment through a range of operation at least between a position substantially below said fixed scale and a position substantially coplanar with said fixed scale for ready determination of the shift of the aircraft center of gravity throughout said range.

4. A scale installation for weighing and determining the shift in the center of gravity of an aircraft comprising, a fixed scale having a platform maintained at ground level for rolling the main gear of the aircraft undercarriage thereon, and an adjustable scale having a pair of supporting longitudinal beams, crossties connected between said beams and supporting a plurality of motor means operable therein, an adjustable platform at ground level for rolling the auxiliary gear of the aircraft undercarriage thereon comprising a plurality of segments supported on said motor means, said motor means providing each of said platform segments with a range of operation at least between a position substantially coplanar with said fixed scale and a position substantially above said fixed scale so that during weighing operations the shift in the center of gravity of the aircraft may be readily determined throughout said range.

5. A scale installation for weighing and determining the shift in the center of gravity of an aircraft comprising a fixed scale having a platform maintained at ground level for rolling the main gear of the aircraft undercarriage thereon, and an adjustable scale section having a pair of supporting longitudinal beams, crossties connected between said beams and supporting a hydraulic cylinder, and a platform segment mounted on a piston operable in said cylinder and having a range of operation between a position substantially below said fixed scale platform to a position substantially above said fixed scale platform while said fixed scale platform is maintained at said ground level whereby during weighing operations the shift in the center of gravity of the aircraft may be readily determined throughout said range.

6. A scale installation for weighing aircraft having various size wheel bases comprising a fixed scale means and an adjustable scale means, said fixed scale means having a platform for weighing the main gear of an aircraft undercarriage, said adjustable scale means comprising a plurality of platform segments and motor means, said motor means comprising means for operating said platform segments in a range between a position substantially below said fixed scale platform to a position substantially above said fixed scale platform for weighing the auxiliary gear of the aircraft undercarriage.

7. A scale installation for weighing aircraft having various size wheel bases comprising a fixed scale means and an adjustable scale means, said fixed scale means having a platform for weighing the main gear of an aircraft undercarriage, said adjustable scale means having means for operating a platform in a range between a position substantially below said fixed scale platform to a position substantially above said fixed scale platform for weighing the auxiliary gear of the aircraft undercarriage.

References Cited in the file of this patent

UNITED STATES PATENTS

| | | |
|---|---|---|
| 2,047,038 | Smith | July 7, 1936 |
| 2,410,654 | Hem | Nov. 5, 1946 |

FOREIGN PATENTS

| | | |
|---|---|---|
| 641,411 | Germany | Jan. 30, 1937 |